United States Patent [19]

Koyama

[11] Patent Number: 4,803,579

[45] Date of Patent: Feb. 7, 1989

[54] MAGNETO-OPTICAL INFORMATION REPRODUCING APPARATUS IN WHICH DIVIDED REPRODUCING LIGHTS ARE DIFFERENTIALLY DETECTED BY A PHOTODETECTOR HAVING NO AMPLIFYING ACTION THROUGH AN ANALYZER WHOSE TRANSMISSION AXIS AZIMUTH IS OPTIMIZED

[75] Inventor: Osamu Koyama, Kawasaki, Japan

[73] Assignee: Canon Kabushiki Kaisha, Tokyo, Japan

[21] Appl. No.: 106,786

[22] Filed: Oct. 13, 1987

[30] Foreign Application Priority Data

Oct. 17, 1986 [JP] Japan .................................. 61-246614

[51] Int. Cl.$^4$ ............................................ G11B 11/10
[52] U.S. Cl. ..................................................... 360/114
[58] Field of Search .......................................... 360/114

[56] References Cited

U.S. PATENT DOCUMENTS

| | | | |
|---|---|---|---|
| 4,558,440 | 12/1985 | Tomita ................................. | 360/114 |
| 4,561,032 | 12/1985 | Matsumoto et al. ................ | 360/114 |
| 4,569,035 | 2/1986 | Tomita ................................. | 369/13 |

Primary Examiner—Robert S. Tupper
Attorney, Agent, or Firm—Fitzpatrick, Cella Harper & Scinto

[57] ABSTRACT

In a magneto-optical information reproducing apparatus comprising means for applying a light beam polarized in a predetermined direction onto a recording medium on which information is magnetically recorded, means for dividing the reflected or transmitted light beam from the recording medium modulated into a polarized state in conformity with the information by the magneto-optical effect, a plurality of analyzer means having their optic axes inclined in opposite directions with respect to the predetermined direction and analyzing the divided light beams, a plurality of photodetectors having no amplifying action and photoelectrically detecting the light beams transmitted through the plurality of analyzer means, and a signal processing circuit for amplifying the detection signals of the plurality of photodetectors, differentiating them and reproducing the information, the angle $\theta_A$ formed between the optic axes of the plurality of analyzer means and the predetermined direction satisfies the following conditions:

$$\sin^2\theta_A \sim \frac{S+T}{(1-\eta_A)\cdot S}\left(1 - \sqrt{\frac{\eta_A S + T}{S+T}}\right)$$

$$S = 2e\kappa\epsilon|t_A|^2|R|^2 I_0 \cdot \Delta B$$

where $I_0$ is the quantity of light of the incident light beam on the recording medium, R is the amplitude reflectance of the recording medium, $\epsilon$ is the light utilization efficiency of the optical system from the recording medium to the photodetectors except the analyzer means, $\kappa$ is the photoelectric conversion efficiency of the photodetectors, e is the amount of charge, T is the thermal noise of the amplifying means in a magneto-optical signal observation frequency, $\Delta B$ is the band width of the detection signals, $t_A$ is the amplitude transmittance of the analyzer means, and $\eta_A$ is the extinction ratio of the analyzer means.

5 Claims, 6 Drawing Sheets

MAGNETO-OPTICAL INFORMATION REPRODUCING APPARATUS IN WHICH DIVIDED REPRODUCING LIGHTS ARE DIFFERENTIALLY DETECTED BY A PHOTODETECTOR HAVING NO AMPLIFYING ACTION THROUGH AN ANALYZER WHOSE TRANSMISSION AXIS AZIMUTH IS OPTIMIZED

BACKGROUND OF THE INVENTION

1. Field of the Invention

The present invention relates to a magneto-optical information reproducing apparatus which utilizes the magneto-optical effect to reproduce information magnetically recorded on a recording medium.

2. Related Background Art

In recent years, optical memories for effecting recording and reproduction by a laser beam have been actively studied and developed for practical use as high-density recording memories. Of these, magneto-optical disks capable of erasing and re-writing have been regarded as promising, with optical disks exclusively for reproduction typified by compact disks and direct read after write (DRAW) type optical disks. Magneto-optical disks are such that information is magnetically recorded by the utilization of the localized temperature rise of a magnetic thin film caused by the application of a laser spot thereto and the information is reproduced by the magneto-optical effect (particularly the Kerr effect.) The Kerr effect refers to the phenomenon that the plane of polarization is rotated when light is reflected by a magnetic recording medium.

The basic construction of a magneto-optical disk apparatus according to the prior art is shown in FIG. 1 of the accompanying drawings. In FIG. 1, the reference numeral 1 designates a semiconductor laser, the reference numeral 2 denotes a collimator lens, the reference numerals 11 and 20 designate half-mirrors, the reference numeral 4 denotes an objective lens, the reference numeral 6 designates a magneto-optical recording medium, the reference numerals $7_1$ and $7_2$ denote analyzers, the reference numeral 8 designates a condensing lens, and the reference numerals $9_1$ and $9_2$ denote photodetectors. The direction of P-polarization is parallel to the plane of the drawing sheet, and the direction of S-polarization is perpendicular to the plane of the drawing sheet.

Description will now be made of a case where magneto-optical information is reproduced in such apparatus. A light beam emitted from the semiconductor laser 1 as a rectilinearly polarized light in the direction of P-polarization is collimated by the collimater lens 2 and passes through the half-mirror 11. If the P-polarized component amplitude transmittance is $t_p$ and the S-polarized component amplitude transmittance is $t_s$, $|t_p|^2 = |t_s|^2 = 0.5$ in the half-mirror 11. The light beam is imaged as a minute spot on the magneto-optical recording medium 6 by the objective lens 4. When a magnetic section (pit) is pre-formed on the medium 6, as shown in FIG. 2 of the accompanying drawings, the reflected light from the medium 6 is subjected to the rotation of the plane of polarization of $\pm\theta_k$ by the Kerr effect in conformity with whether the direction of magnetization of the spot-applied area is upward or downward. Here, if the P-polarized component of the amplitude reflectance of the recording medium 6 is R and the S-polarized component is K, the following equation is established:

$$\theta_k = \frac{|K|}{|R|} \quad (1)$$

The magneto-optically modulated reflected light is again collimated by the objective lens 4 and reflected by the half-mirror 11, whereafter it is made into a convergent light beam by the condensing lens 8 and divided by the half-mirror 20, and the divided lights pass through the analysers $7_1$ and $7_2$, respectively, and are detected as intensity-modulated light beams by the photodetectors $9_1$ and $9_2$. That is, as shown in FIG. 2, the angle of the optic axis of the analyzer with respect to the direction of P-polarization is $\pm\theta_A$ on the transmission side and the reflection side, and the light beam is analyzed as a regular projection of the amplitude thereof onto the optic axis of the analyzer.

Considering that the Kerr rotation angle is of the order of 1° and that the magneto-optical modulated component is of a very minute amount, it is necessary that the azimuth angle $\theta_A$ of the optic axis of the analyzer be set to such an optimum position that the C/N (the ratio between the carrier wave and the noise) of the detection signal becomes maximum. For example, in U.S. Pat. No. 4,569,035 issued on Feb. 4, 1986, there is shown an example of an apparatus using as a photodetector an avalanche photodiode (APD) or the like having a multiplying action wherein the azimuth of the transmission axis (the optic axis) of the analyzer is optimized. On the other hand, in an apparatus using a photodetector a PIN photodiode or the like having no multiplying action, the azimuth angle $\theta_A$ of the optic axis of the analyzer has been set to 45° so that the signal light becomes maximum. When the Kerr rotation angle is $+\theta_k$, if the quantity of light incident on the recording medium is $I_O$, the quantities of light passing through the analyzers on the transmission side and the reflection side and entering the respective photodetectors are:

$$\begin{cases} \text{Transmission:} & I_t = \frac{1}{4} I_0(|R|\cos 45° + |K|\sin 45°)^2 \\ \text{Reflection:} & I_r = \frac{1}{4} I_0(|R|\cos 45° - |K|\sin 45°)^2. \end{cases} \quad (2)$$

Since $\theta_k \sim 1°$, $|R|^2 >> |K|^2$ is established and thus, equation (2) can be expressed as follows:

$$\begin{cases} I_t = \frac{1}{8} I_0(|R|^2 + 2|R||K|) \\ I_r = \frac{1}{8} I_0(|R|^2 - 2|R||K|) \end{cases} \quad (3)$$

In equation (3), the second term in the parentheses is the magneto-optical modulated component and the first term in the parentheses is the non-modulated component. These lights are photoelectrically converted by the photodetectors $9_1$ and $9_2$, respectively, and differentially detected by a differential circuit, not shown, whereby a magneto-optical signal is obtained. However, when the noise superposed on the detection signal is taken into consideration, maximum C/N cannot always be obtained by providing $\theta_A = 45°$.

On the other hand, a magneto-optical information reproducing apparatus using a polarizing beam splitter instead of the half-mirror 11 shown in FIG. 1 to improve the C/N of the above-mentioned reproducing signal is proposed in U.S. Pat. No. 4,561,032 issued on Dec. 24, 1985. Further, an example in which the polarizing characteristic of this polarizing beam splitter is set so that C/N is maximum is disclosed in U.S. Pat. No. 4,558,440 issued on Dec. 10, 1985. However, in these examples as well, the azimuth angle of the optic axis of the analyzer is defined as 45°, and no mention is made of optimizing this azimuth angle and a specific method therefor.

SUMMARY OF THE INVENTION

It is the object of the present invention to further improve the above-described prior art and to provide a magneto-optical information reproducing apparatus which is simple in construction and capable of reproducing magneto-optical signals of acceptable C/N by the use of an inexpensive photodetector such as a PIN photodiode having no amplifying action.

The above object of the present invention is achieved by constructing a magneto-optical information reproducing apparatus of means for applying a light beam polarized in a predetermined direction onto a recording medium on which information is magnetically recorded, means for dividing the reflected or transmitted light beam from said recording medium modulated into a polarized state in conformity with said information by the magneto-optical effect, a plurality of analyzer means having their optic axes inclined in opposite directions with respect to said predetermined direction and analyzing said divided light beams, a plurality of photodetectors having no amplifying action and photoelectrically detecting the light beams transmitted through said plurality of analyzer means, and a signal processing circuit for amplifying the detection signals of said plurality of photodetectors, differentiating them and reproducing said information, and setting the angle $\theta_A$ formed between the optic axes of said plurality of analyzer means and said predetermined direction so as to satisfy the following conditions:

$$\sin^2\theta_A \sim \frac{S+T}{(1-\eta_A)\cdot S}\left(1 - \sqrt{\frac{\eta_A S + T}{S+T}}\right)$$

$$S = 2e\kappa\epsilon|t_A|^2|R|^2I_0 \cdot \Delta B$$

where $I_0$ is the quantity of light of the incident light beam on said recording medium, R is the amplitude reflectance of said recording medium, $\epsilon$ is the light utilization efficiency of the optical system from the recording medium to the photodetectors except said analyzer means, $\kappa$ is the photoelectric conversion efficiency of said photodetectors, e is the amount of charge, T is the thermal noise of said amplifying means in a magneto-optical signal observation frequency, $\Delta B$ is the band width of the detection signals, $t_A$ is the amplitude transmittance of said analyzer means, and $\eta_A$ is the extinction ratio of said analyzer means.

DESCRIPTION OF THE PREFERRED EMBODIMENTS

The present invention will hereinafter be described in detail with reference to the drawings.

Figure 3:
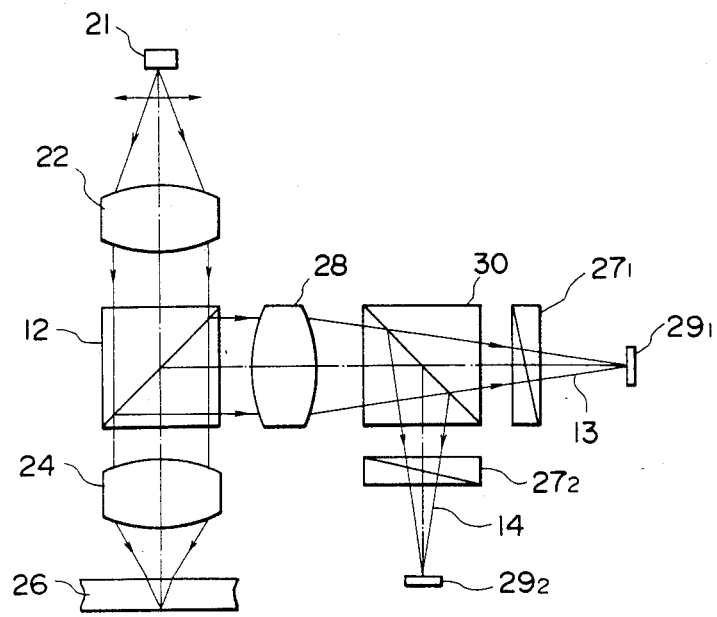
FIG. 3 schematically shows an optical system according to an embodiment of the present invention.
Figure 4:
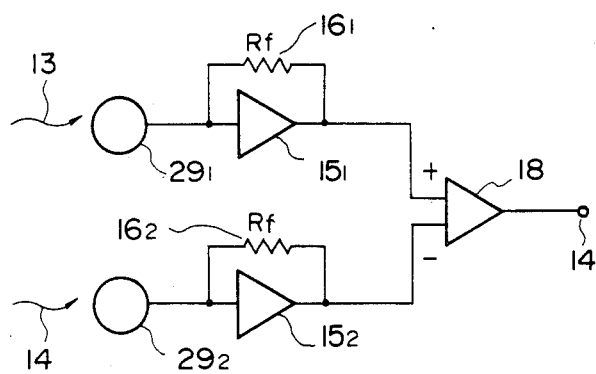
FIG. 4 schematically shows a signal processing system in the embodiment shown in FIG. 3.

FIGS. 3 and 4 show a first embodiment of a magneto-optical information reproducing apparatus according to the present invention, and more particularly, FIG. 3 schematically shows the construction of an optical system and FIG. 4 schematically shows the construction of a signal processing circuit. In FIG. 3, the reference numeral 21 designates a semiconductor laser, the reference numeral 22 denotes a collimator lens, the reference numeral 12 designates a polarizing beam splitter, the reference numeral 24 denotes an objective lens, the reference numeral 26 designates a magneto-optical recording medium, the reference numeral $27_1$ and $27_2$ denote analyzers, the reference numeral 28 designates a condensing lens, the reference numerals $29_1$ and $29_2$ denote photodetectors such as PIN photodiodes having no amplifying action, and the reference numeral 30 designates a half-mirror. The direction of P-polarization is parallel to the plane of the drawing sheet, and the direction of S-polarization is perpendicular to the plane of the drawing sheet. The reference numerals 13 and 14 designate light beams transmitted through the analyzers $27_1$ and $27_2$. The detection light beams 13 and 14, as shown in FIG. 4, are photoelectrically converted by the photodetectors $29_1$ and $29_2$, and voltage-amplified by amplifiers $15_1$ and $15_2$ including load resistors $16_1$ and $16_2$, whereafter they are differentiated by a differential amplifier 18 and output as a reproducing signal from a terminal 14.

In the above-described apparatus, the semiconductor laser 21 emits a P-polarized light beam. This emitted light beam is collimated by the collimator lens 22, is transmitted through the polarizing beam splitter and is applied as a light spot of intensity $I_0$ onto the recording medium 26 by the objective lens 24. The light beam reflected by the recording medium 26 is modulated into a polarized state in conformity with the information magnetically recorded on the recording medium 26, again passes through the objective lens 24, is reflected by the polarizing beam splitter 12, is made into a convergent light beam by the condensing lens 28 and is directed to the half-mirror 30. The light beams reflected by and transmitted through the half-mirror 30 pass through the analyzers $27_1$ and $27_2$, respectively, and are intensity-modulated thereby and received by the photodetectors, $29_1$ and $29_2$. If the amplitude transmittances of the polarizing beam splitter for P-polarized light and S-polarized light are $t_p$ and $t_s$, respectively, and the amplitude reflectances of the polarizing beam splitter for P-polarized light and S-polarized light are $r_p$ and $r_s$, respectively, the intensities $I_t$ and $I_r$ of the detection lights 13 and 14 can be expressed as follows in a case where the Kerr rotation angle is $+\theta_k$:

$$\begin{cases} I_t = \frac{1}{2} I_0 \{Rr_p \cos\theta_A + Kr_s \sin\theta_A\}^2 \\ I_r = \frac{1}{2} I_0 \{Rr_p \cos\theta_A - Kr_s \sin\theta_A\}^2 \end{cases} \quad (4)$$

With $|R|^2 >> |K|^2$ being taken into consideration, equation (4) can be expressed as follows:

$$\begin{cases} I_t \sim \frac{1}{2} I_0\{|R|^2|r_p|^2 \cos^2\theta_A + |R||K||r_p||r_s|\sin 2\theta_A\} \\ I_r \sim \frac{1}{2} I_0\{|R|^2|r_p|^2 \cos^2\theta_A - |R||K||r_p||r_s|\sin 2\theta_A\} \end{cases} \quad (5)$$

In expression (5), the second term in the parentheses is the magneto-optical modulated component and the first term in the parentheses is the non-modulated component. If these are differentially detected by the circuit shown in FIG. 4, the first terms are offset and the photocurrent $i_{diff}$ of only the magneto-optical modulated component is:

$$i_{diff} = \kappa I_0 |R||K||r_p||r_s| \sin 2\theta_A \quad (6)$$

If the Kerr rotation angle is $-\theta_k$, equation (6) becomes $-\kappa I_0 |R||K||r_p||r_s| \sin 2\theta_A$ and a magneto-optical modulation signal is obtained. Here, $\kappa$ indicates the photoelectric conversion efficiency and is given by the following equation:

$$\kappa = \frac{e\rho}{h\nu} \quad (7)$$

where e is the amount of charge, h is the Planck's constant, $\rho$ is the quantum efficiency of the photodetectors and $\nu$ is the frequency of the light beam. If the magneto-optical modulated component intensity is $I_k$ and the non-modulated component intensity is $I_R$, these are expressed as follows:

$$I_k \sim \frac{1}{\sqrt{2}} I_0 |R||K||r_p||r_s|\sin 2\theta_A \quad (8)$$

$$I_R \sim I_0 |R|^2 |r_p|^2 \cos^2\theta_A \quad (9)$$

It is to be understood that the output of the semiconductor laser is adjusted irrespective of the amplitude transmittances $t_p$ and $t_s$ of the polarizing beam splitter so that the incident light $I_0$ may be a predetermined quantity of light.

In the present invention, as a result of many experimental studies of the noise superposed on the detection signal, it has been found that there are the following four kinds of noises and they have different dependencies on the azimuth angle $\theta_A$ of the analyzers.

(1) the noise attributable to the square mean intensity fluctuation $\Delta I^2_R$ of a non-modulated component light $I_R$;

(2) the noise attributable to the square mean intensity fluctuation $\Delta I^2_k$ of a modulated component light $I_k$;

(3) the shot noise of the photodetectors; and (4) the thermal noise by the amplifier.

Of these, the noise by $\Delta I^2_k$ mentioned under item (1) above is offset by effecting differential detection, but the noises mentioned under items (2), (3) and (4) above remain and particularly, the thermal noise becomes twice because there are provided two amplifiers.

The noise by $\Delta I^2_k$ is caused by the surface roughness and heterogeneity of the recording medium and the intensity fluctuation of the semiconductor laser, and if the constant determined by those noise sources is $\xi$ and the average of the actual effective values of the modulated component is $I_k$, the following equation is established:

$$\Delta I^2_k = \xi \Delta \bar{I}^2_k \Delta B, \quad (10)$$

where $\Delta B$ is the band width of the detection signal. If the noise attribulable to $\Delta I^2_k$, the shot noise and thermal noise are $F_k$, S and T, respectively, they may be expressed as follows:

$$F_k = \xi \kappa^2 I \Delta B \quad (11)$$

$$S = 2e\kappa I_R \Delta B \quad (12)$$

$$T = \frac{4kT_e}{R_f} \Delta B \quad (13)$$

where $\bar{I}_R$ is the mean value of the non-modulated component, k is the Boltzmann constant, $T_e$ is the equivalent noise temperature, and $R_f$ is the resistance value of the load resistors $16_1$ and $16_2$. By expressions (8) and (9), with respect to the azimuth angle $\theta_A$ of the optic axis of the analyzers, the magneto-optical modulated component intensity $I_k$ has the dependency of $\sin 2\theta_A$ and the non-modulated component intensity $I_R$ has the dependency of $\cos^2\theta_A$ and therefore, the $\theta_A$-dependencies of the respective noises can be expressed as follows:

$$F_k \propto \sin^2 2\theta_A \quad (14)$$

$$S \propto \cos^2 \theta_A \quad (15)$$

$$T = const. \quad (16)$$

By the use of these, C/N can be expressed in decibel indication as follows:

$$C/N = 10 \log_{10} \left\{ \frac{1}{2} \kappa^2 I_k^2 / \left( \frac{1}{2} \xi \kappa^2 I_k^2 + 2e\kappa \bar{I}_R + \frac{4kT_e}{R_f} \right) \Delta B \right\}. \quad (17)$$

The C/N of equation (17) is a function of the amplitude reflectances $r_p$ and $r_s$ of the polarizing beam splitter and the angle $\theta_A$ of the optic axis of the analyzers with respect to the direction of P-polarization and therefore, equation (17) is differentiated by $|r_p|$, $|r_s|$ and $\theta_A$ to find the extremal value as follows: With regard to $|r_p|^2$, the extremal value found is $$\partial(C/N)/\partial(|r_p|^2) > 0 \text{ and}$$

$$|r_p|^2 = 1 \quad (18)$$

and with regard to $|r_s|^2$, the extremal value found is $$\partial(C/N)/\partial(|r_s|^2) > 0 \text{ and}$$

$$|r_s|^2 = 1 \tag{19}$$

and with regard to $\theta_A$, the extremal value found is $$\sin^2 \theta_A = \frac{s+t}{s}\left(1 - \sqrt{\frac{t}{s+t}}\right) \tag{20}$$

$$s = 2e\kappa|r_p|^2 |R|^2 I_0 \cdot \Delta B \tag{21}$$

$$t = T \tag{22}$$

If by the use of a polarizing beam splitter having a polarizing characteristic which will satisfy expressions (18)–(22), the optic axis of the analyzers is inclined with respect to the direction of P-polarization, C/N can be made a maximum value. However, in expression (18), the incident light is taken in the direction of P-polarization and therefore actually, this expression is impossible and a suitable value must be determined.

Figure 5:
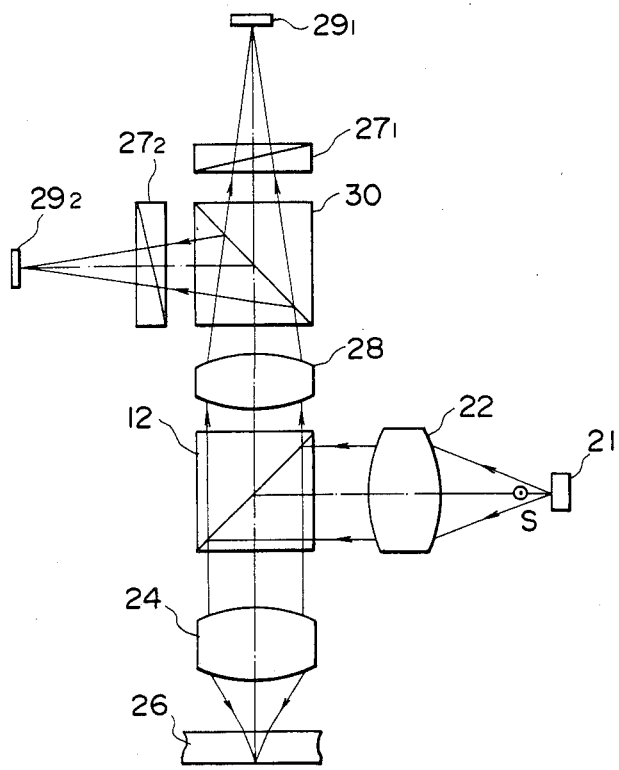
FIGS. 5 and 6 schematically show another embodiment of the present invention.

FIG. 5 schematically shows the construction of an optical system according to a second embodiment of the present invention. The present embodiment is a modification of the aforedescribed first embodiment in which the light beam transmitted through the polarizing beam splitter 12 may be detected. In FIG. 5, members similar to those in FIG. 3 are given similar reference numerals and need not be described in detail. THe signal processing circuit may be one similar to that shown in FIG. 4.

In the case of the present embodiment, consideration may be given with the direction of polarization of the semiconductor laser 21 being the direction of S-polarization perpendicular to the plane of the drawing sheet and with the directions of P-polarization and S-polarization used in the description of FIG. 3 being replaced with each other. However, in expressions (4)–(10), $r_p$ and $r_s$ need be replaced with $t_s$ and $t_p$, respectively. That is, $$I_K \sim \frac{1}{\sqrt{2}} I_0 |R| |K| |t_s| |t_p| \sin 2\theta_A. \tag{23}$$

$$I_R \sim I_0 |R|^2 |t_s|^2 \cos^2 \theta_A \tag{24}$$

The C/N of equation (17) is a function of the amplitude transmittances $t_s$ and $t_p$ of the polarizing beam splitter and the inclination $\theta_A$ of the optic axis of the analyzers with respect to the direction of S-polarization and therefore, equation (17) may be differentiated by $|t_s|$, $|t_p|$ and $\theta_A$ to find the extremal value. With regard to $|t_s|$, the extremal value found is $$\partial(C/N)/\partial(|t_s|^2) > 0 \text{ and}$$

$$|t_s|^2 = 1 \tag{25}$$

and with regard to $|t_p|^2$, the extremal value found is $$\partial(C/N)/\partial(|tp|^2) > 0 \text{ and}$$

$$|t_p|^2 = 1 \tag{26}$$

and with regard to $\theta_A$, the extremal value found is $$\sin^2 \theta_A = \frac{s+t}{s}\left(1 - \sqrt{\frac{t}{s+t}}\right) \tag{27}$$

$$s = 2e\kappa|t_s|^2 |R|^2 I_0 \cdot \Delta B \tag{28}$$

$$t = \cdot T \tag{29}$$

If by the use of a polarizing beam splitter having a polarizing characteristic which will satisfy expressions (25)–(29), the optic axis of the analyzers is inclined with respect to the direction of S-polarization, C/N can be made a maximum value. However, in expression (26), the incident light is caused to enter in the direction of S-polarization and therefore, actually, this expression is impossible and a suitable value must be determined.

Figure 6:
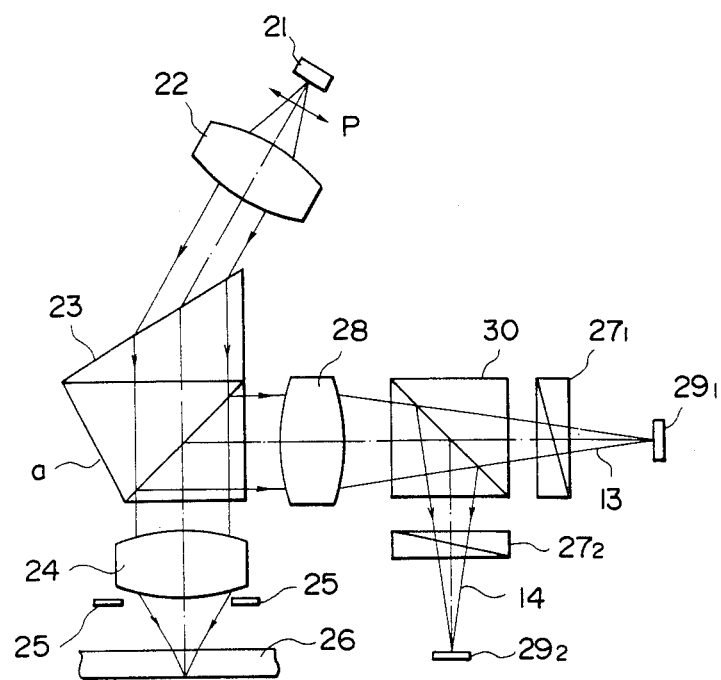

FIG. 6 schematically shows a third embodiment of the present invention. In FIG. 6, members similar to those in FIG. 3 are given similar reference numerals and need not be described in detail. Again in this embodiment, the signal processing system subsequent to the photo-detectors 29 is constructed as shown in FIG. 4.

In the present embodiment, a polarizing beam splitter 23 having the beam shaping function is used instead of the polarizing beam splitter 12 in the first embodiment. Thereby, the light beam from the semiconductor laser 21 having an elliptical far field image can be efficiently imaged as a circular spot on the recording medium 26. The surface a of the polarizing beam splitter 23 is inclined by a predetermined angle so that stray light may not enter the photodetectors $29_1$ and $29_2$. On the recording medium 26, tracking grooves (not shown) are formed in a direction perpendicular to the plane of the drawing sheet, and the light beam condensed on the recording medium 26 by the objective lens 24 is diffracted by these grooves. The reference numeral 25 designates a photodetector for detecting any unbalance of ±1st-order diffracted lights caused by track deviation. The photodetector 25 is fixed to the marginal edge of an opening in the objective lens 24. This leads to the advantage that no offset is caused to the tracking error signal even if the objective lens 24 is moved in the tracking grooves in a direction perpendicular thereto.

The photodetectors $29_1$ and $29_2$ are photodetectors having no amplifying action such as Si-PIN photodiodes, and effect the detection of a magneto-optical signal and a focus error signal. A conventional method is used for the detection of the focus error, but it has no direct relation with the present invention and therefore need not be described in detail.

In the description of FIG. 3, the reduction in the signal level has been described as being not caused by the recording medium and the optical system, but it must be taken into consideration in accurately foreseeing C/N in the actual optical system. The following two points are conceivable as the causes of the reduction in the signal level:

(I) Loss of the quantity of light (the reduction in amplitude by absorption and eclipse); and (II) the phase difference between the P-polarized light and the S-polarized light.

(I) and (II) contribute to the reduction in the magneto-optical modulated component intensity, and (I) alone contributes to the reduction in the non-modulated component intensity. To evaluate the reduction in the magneto-optical non-modulated component intensity (loss of the quantity of light), the light utilization efficiency $\epsilon_R$ is defined. It should be noted that in the present invention, as the light utilization efficiency, attention is paid to the ratio between the quantity of light on the recording medium and the quantity of light reaching the photodetectors. In the present embodiment, when finding $\epsilon_R$, the following points have been taken into consideration:

(A) The rate at which the diffracted light from the tracking grooves (pitch 1.6 μm, depth $\lambda/8$, $\lambda=835$ nm) enters the entrance pupil of the objective lens is regarded as the light utilization efficiency; and (B) With the product along the optical path of the square of the P-polarization direction amplitude transmittances (or reflectances) of n optical elements except the polarizing beam splitter and the analyzers present in the optical path leading from the recording medium to the photodetectors being taken into consideration, the light utilization efficiency is defined as $\epsilon_1$. If the amplitude transmittance and reflectance of the ith optical element are $t_{pi}$ and $r_{pi}$, $\epsilon_1$ can be expressed as follows:

$$\epsilon_1 = \prod_{i=1}^{n} |t_{pi}|^2 \tag{30}$$

In equation (30), where the light beam is reflected by the ith optical element, $|r_{pi}|^2$ may be substituted instead of $|t_{pi}|^2$. The polarizing characteristic $|r_p|^2$ of the polarizing beam splitter and the transmittance of the analyzers are handled as an amount of variation during the calculation of C/N and are therefore excepted from $\epsilon_1$. From (A) and (B), the light utilization efficiency $\epsilon_R$ of the mangeto-optical non-modulated component can be expressed as follows:

$$\epsilon_R = \epsilon_0 \epsilon_1 \tag{31}$$

Figure 1:
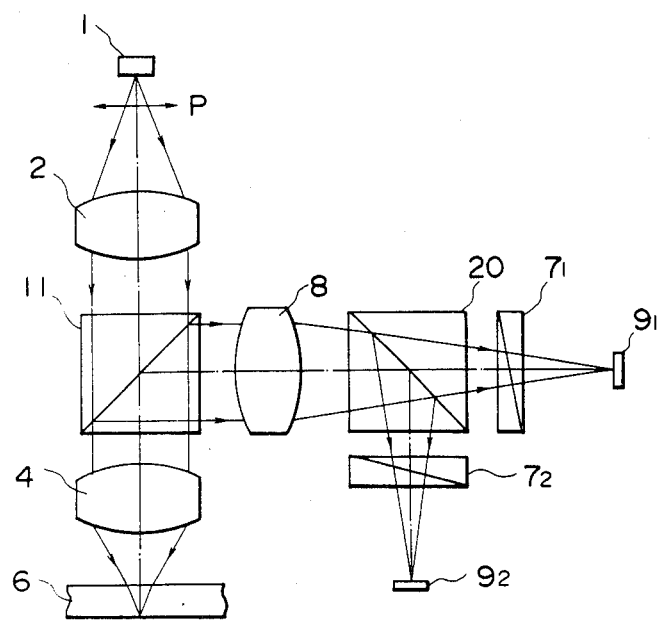
FIG. 1 schematically shows an example of a magneto-optical information reproducing apparatus according to the prior art.
Figure 2:
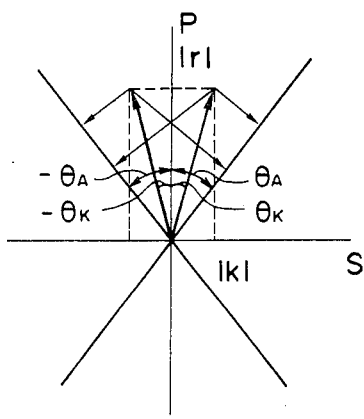
FIG. 2 illustrates the principle of the general magneto-optical signal detection.
Figure 7:
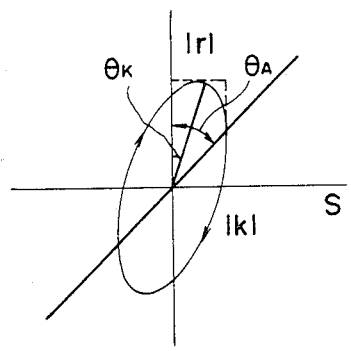
FIG. 7 shows the polarized state of the reflected light from a magneto-optical recording medium.

The reduction in the intensity of the magneto-optical modulated component is now considered. For this purpose, the phase difference between the P-polarized light and the S-polarized light must be taken into account in addition to the loss of quantity of light. For example, it is known that as shown in FIG. 7, the reflected light from the recording medium is generally not a rectilinearly polarized light as shown in FIG. 2 but an elliptically polarized light whose major axis is inclined by the Kerr rotation angle $\theta_k$ due to the phase difference created between the P-polarized component and the S-polarized component. That is, the P- and S-polarized components R and K of the amplitude reflectance of the recording medium can be expressed as follows:

$$\begin{cases} R = |R| e^{i\alpha 0} \\ K = |K| e^{i\alpha 0} \\ \Delta 0 = \alpha 0 - \beta 0 \end{cases} \tag{32}$$

where $\alpha_0$ and $\beta_0$ are the phase components of respective amplitude reflectances. In this case, the Kerr rotation angle $\theta_k$ can be expressed as follows:

$$\theta_k = \frac{|K|}{|R|} \cos\Delta 0 \tag{33}$$

If $\Delta_0 = n\pi$ (n=integer), the reflected light from the recording medium becomes a rectilinearly polarized light, but in the other cases, it decreases $\theta_k$, and this is not desirable.

This also holds true of the optical elements, and in the present embodiment, the light utilization efficiency $\epsilon_k$ is defined to evaluate the reduction in the intensity of the magneto-optical modulated component, and when finding $\epsilon_k$, the following point has been taken into account.

For the magneto-optical modulated component, the light utilization efficiency is defined as $\epsilon_2$ with the product along the optical path of the P and S polarization direction amplitude transmittances (or reflectances) of n optical elements except the polarizing beam splitter and the analyzers present in the optical path leading from the recording medium to the photodetectors being taken into consideration. If the P and S polarization direction amplitude transmittances of the ith optical element are $t_{pi}$ and $t_{si}$ (in the case of the reflectances, $r_{pi}$ and $r_{si}$), the following equations are established:

$$\begin{cases} t_{pi} = |t_{pi}| e^{i\beta i} \\ t_{si} = |t_{si}| e^{i\beta i} \\ \Delta i = \alpha i - \beta i \end{cases} \tag{34}$$

By the use of equation (34), $\epsilon_i$ is expressed as follows:

$$\epsilon_2 = \epsilon_2' \cdot \epsilon_2'' = \prod_{i=1}^{n} |t_{pi}||t_{si}| \cdot \cos\left(\sum_{i=1}^{n} \Delta i\right) \tag{35}$$

In equation (35), where the light beam is reflected by the ith optical element, $|r_{pi}|$ $|r_{si}|$ may be substituted instead of $|t_{pi}|$ $|t_{si}|$.

The polarizing characteristic of the polarizing beam splitter and the transmittance of the analyzers are handled as an amount of variation during the calculation of C/N and are therefore excepted from $\epsilon_2$.

Thus, the light utilization efficiency $\epsilon_k$ of the magneto-optical modulated component is expressed as follows:

$$\epsilon_k = \epsilon_0 \epsilon_2 \tag{36}$$

As regards the polarizing beam splitter, if the P and S polarization direction amplitude reflectances are $r_p$ and $r_s$, respectively, then $$\begin{cases} r_p = |r_p| e^{i\gamma} \\ r_s = |r_s| e^{i\delta} \\ \Delta PBS = \gamma - \delta \end{cases} \tag{37}$$

where $\lambda$ and $\delta$ are the phase components of respective amplitude reflectances. More accurate evaluation is also made of the analyzers. If the amplitude transmittance and the extinction ratio of the analyzers are $t_A$ and $\eta_A$, respectively, consideration may be given with $\cos \theta_A$ substituted for by $$|t_A| \cdot (\cos \theta_A + \sqrt{\eta_A} \sin \theta_A)$$

and $\sin \theta_A$ substituted for by $$|t_A| \cdot (\sin \theta_A + \sqrt{\eta_A} \cos \theta_A)$$

in equation (4). As $|R|^2 >> |k|^2$, the product of $\epsilon_k$ and the transmittance $\epsilon_3$ of the analyzer given by the following equation may be taken for the magneto-optical modulated component intensity:

$$\epsilon_3 = |t_A|^2(1-\eta_A)\sin^2\theta_A \tag{38}$$

However, it is to be undestood that the amplitude transmittance of the analyzers is equal between the P-polarized component direction and the S-polarized component direction and does not provide a phase difference between the P-polarized light and the S-polarized light. For the magneto-optical non-modulated component, the product of $\epsilon_R$ and the transmittance $\epsilon_4$ of the analyzers given by the following equation may be taken:

$$\epsilon_4 = |t_A|^2(\cos^2\theta_A + \eta_A \sin^2\theta_A) \tag{39}$$

Thus, if the intensities of the magneto-optical modulated component and non-modulated component are I and $I_R$, respectively, they are expressed as follows:

$$I_k \sim \frac{1}{\sqrt{2}} I_0 \epsilon_0 \epsilon_{2'} |t_A|^2 |r_p||r_s||R||K|(1-\eta_A) \tag{40}$$

$$\sin 2\theta_A \cos\left(\sum_{i=0}^{n} \Delta i + \Delta PBS\right)$$

$$I_R \sim I_0 \epsilon_0 \epsilon_1 |t_A|^2 |r_p|^2 |R|^2 (\cos^2\theta_A + \eta_A \sin^2\theta_A) = \tag{41}$$

$$I_0 \epsilon_R |t_A|^2 |r_p|^2 |R|^2 (\cos^2\theta_A + \eta_A \sin^2\theta_A)$$

By substituting expressions (40) and (41) into equation (17), the polarizing characteristic of the polarizing beam splitter which maximizes C/N and the angle $\theta_A$ of the optic axis of the analyzers with respect to the direction of P-polarization can be found as follows:

$$|r_p|^2 = 1 \tag{42}$$

$$|r_s|^2 = 1 \tag{43}$$

$$\sin^2\theta_A = \frac{s'+t'}{(1-\eta_A)\cdot s'}\left(1 - \sqrt{\frac{\eta_A s' + t'}{s' + t'}}\right) \tag{44}$$

$$s' = 2e\kappa\epsilon_R|t_A|^2|r_p|^2|R|^2 I_o \cdot \Delta B \tag{45}$$

$$t' = T \tag{46}$$

However, in equation (43), the incident light is taken in the direction of P-polarization and therefore, actually, this equation is impossible, and in the embodiment, a suitable value must be determined.

Conditions for calculation will be shown below.

The semiconductor laser 21 has a wavelength of $\lambda = 835$ nm and the output thereof is adjusted irrespective of the transmittance $|t_p|^2$ of the polarizing beam splitter so that the quantity of incident light on the recording medium 26 is $I_0 = 2 \times 10^{-3}$ W.

GdTbFeCo is used as the recording medium 26, $|R|^2 = 0.12$, $\theta_k = 0.74°$, and the phase difference $\Delta_0$ between the phase components $\alpha_0$ and $\beta_0$ of P- and S-polarization direction amplitude reflectances is $\Delta_0 = 20°$.

The light utilization efficiency $\epsilon_0$ is $\epsilon_0 = 0.6$ when the diffracted light from the tracking grooves (pitch 1.6 μm and depth $\lambda/8$) is received by an objective lens of N.A.=0.5. The light utilization efficiency $\epsilon_1$ is $\epsilon_1 = 0.79$ with the product of the transmittances of the optical elements except the polarizing beam splitter and the analyzers present in the optical path leading from the recording medium to the photodetectors being taken into consideration.

As regards the light utilization efficiency $\epsilon_2$, the product of P and S amplitude transmittances of the optical elements except the polarizing beam splitter and the analyzers present in the optical path leading from the recording medium to the photodetectors may be taken into consideration. In the present embodiment, there is no optical element which provides a phase difference between the P-polarized light and the S-polarized light when they are equivalent to each other and therefore $$\epsilon_2'' = \cos\left(\sum_{i=1}^{n} \Delta i\right) = 1$$

and also, $|t_{pi}| = |t_{si}|$ and hence, $\epsilon_2 = 0.79$.

The photodetector 25 is an $S_i$-photodiode of photoelectric conversion efficiency $\kappa = 0.54$. The constants $\xi$ and $\zeta$ determined by the noise sources such as the recording medium and the semiconductor laser are given as follows:

$$\xi = 2 \times 10^{-13} \text{ (R.I.N.)}$$

$$\zeta = 1 \times 10^{-11} \text{ (R.I.N.)}$$

Also, the thermal noise T is given as $t = 1 \times 10^{-20}$ by two amplifiers with the Boltzmann constant k being $k = 1.38 \times 10^{-23}$, the transmission noise temperature Te being Te=300 (k), the load resistance $R_f$ per amplifier being $R_f = 1 \times 10^5$ (Ω) and the band width ΔB of the signal detection being $\Delta B = 3 \times 10^4$ (1/Hz). In some cases, the thermal noise T cannot be described in such a simple form as shown in equation (14) depending on the capacity or the like of the photodetectors and therefore, in such cases, T need not conform to such form.

Figure 8:
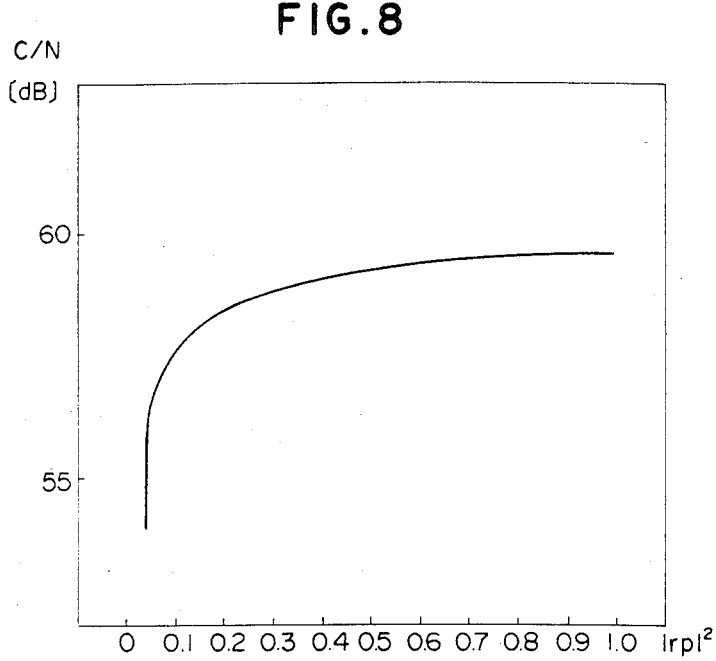
FIGS. 8 and 9 are graphs showing the relation between the polarizing characteristic of a polarizing beam splitter in the present invention and C/N.

The transmittance $|t_A|^2$ and extinction ratio $\eta_A$ of the analyzers are $|t_A|^2 = 0.84$ and $\eta_A = 1 \times 10^{-3}$. Now, according to equation (42), $|r_p|^2 = 1$ provides a maximum value of C/N. This will offer no problem in the case of an optical system for detecting the transmitted light beam from the recording medium, whereas this is not realistic in the case of an optical system for detecting the reflected light beam, like the present embodiment. FIG. 8 shows the dependency of C/N on the polarizing characteristic $|r_p|^2$ of the polarizing beam splitter. C/N has been calculated when $|r_s|^2 = 1$ and the angle $\theta_A$ of the optic axis of the analyzers with respect to the direction of P-polarization assumes such an optimum value that is given by expressions (44), (45) and (46). In FIG. 8, it is seen that the improvement in C/N is slight for $|r_p|^2 > 0.2$. Accordingly, when the utilization efficiency of the output of the semiconductor laser is taken into account, it cannot be said to be advantageous to make $|r_p|^2$ approximate to 1. So, when many conditions, besides the above-described condition, have been examined, it has been found that sufficiently good C/N can be obtained if the polarizing characteristic of the polarizing beam splitter assumes the value as shown below.

$$0.1 \leq |r_p|^2 \leq 0.5 \tag{47}$$

Figure 9:
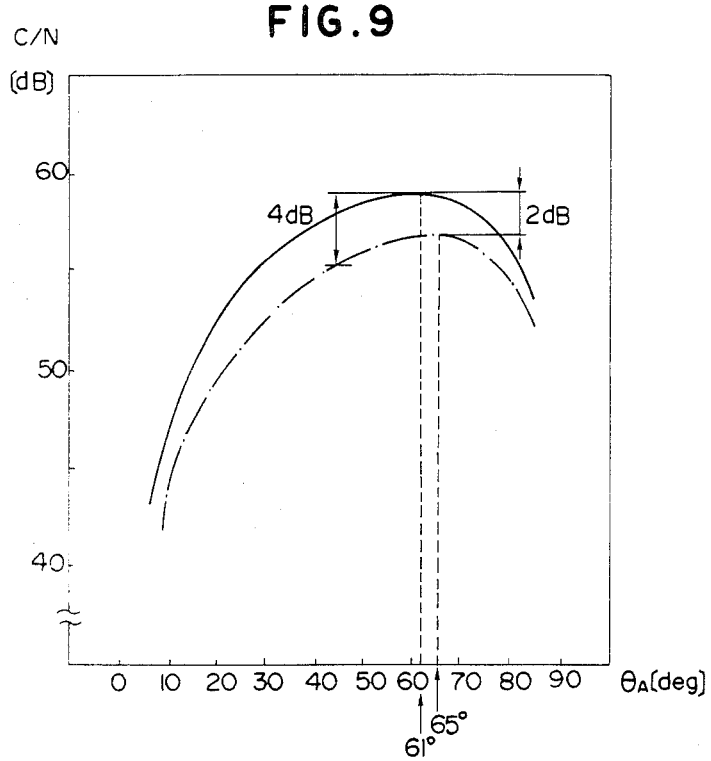

FIG. 9 shows the comparison of the present embodiment with a conventional apparatus using a half-mirror as to C/N with $|r_p|^2$ and $|r_s|^2$ being $|r_p|^2 = 0.3$ and $|r_s|^2 = 1$, respectively.

In FIG. 9, the ordinate represents C/N and the abscissa represents $\theta_A$. In the present embodiment (indicated by solid line), C/N becomes maximum for $\theta_A=61°$, and as compared with the conventional apparatus (indicated by dot-and-dash line) which uses a half-mirror and effects signal detection at $\theta_A=45°$, the present embodiment is improved over 4 dB in C/N. Also, where a half-mirror is used, there is $\theta_A=65°$ which maximizes C/N, but in the present embodiment, C/N is further improved over 2 dB.

In the present embodiment, as compared with the conventional apparatus using a half-mirror, good C/N will be obtained if $\theta_A$ is 50°–70°.

In the present embodiment, the phase difference $\Delta$PBS between the directions of P- and S-polarization caused by the polarizing beam splitter is $\Delta$PBS$=160°$ and has the relation that $$\Delta_0 + \Delta PBS = \pi \qquad (48)$$

with respect to the phase difference $\Delta_0$ caused by the recording medium. Thereby any reduction in the magneto-optical modulated component intensity is prevented. It is easy to make a polarizing beam splitter having such a polarizing characteristic.

Figure 10A:
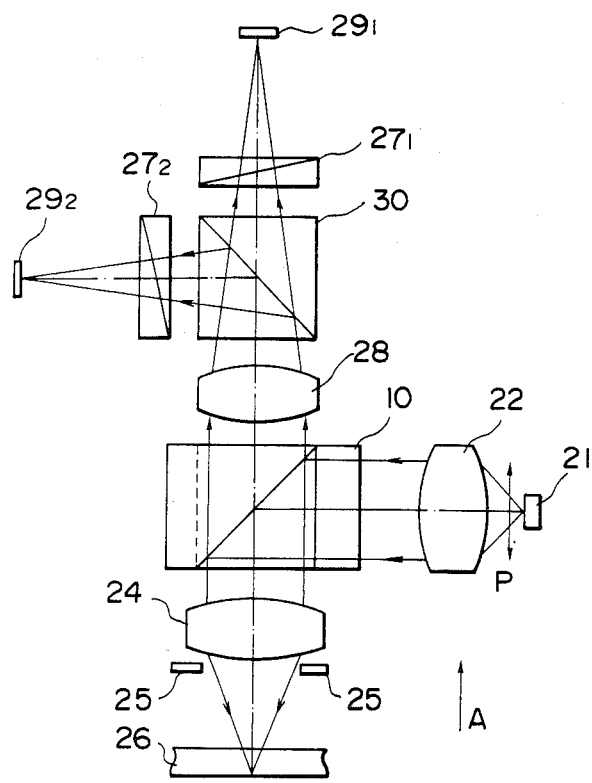
FIGS. 10A and 10B schematically show still another embodiment of the present invention.
Figure 10B:
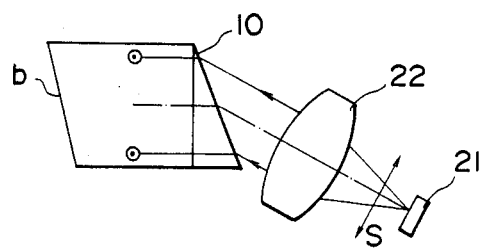

FIGS. 10A and 10B schematically show a fourth embodiments of the present invention, FIG. 10B being a view in which FIG. 10A is seen in the direction of arrow A. In FIGS. 10A and 10B members similar to those in FIG. 6 are given similar reference numerals and need not be described in detail. Again in this embodiment, the signal processing system subsequent to the photodetectors 29 is constructed as shown in FIG. 4. The present embodiment uses a polarizing beam splitter 10 instead of the polarizing beam splitter 23 in the third embodiment and is designed such that the light transmitted through the polarizing beam splitter 10 is detected. The surface b of the polarizing beam splitter 10 is inclined by a predetermined angle so that stray light may not enter the photodetectors 29.

In the present embodiment, consideration may be given with the directions of P-polarization and S-polarization used in the description of FIG. 6 being replaced with each other. However, in expressions (41) and (42), $r_p$ and $r_s$ need be replaced with $t_s$ and $t_p$, respectively. That is, if the intensities of the magneto-optical modulated component and non-modulated component are $I_k$ and $I_R$, respectively, they can be expressed as follows:

$$I_k \sim \frac{1}{\sqrt{2}} I_0 \epsilon_0 \epsilon_2' |t_A|^2 |t_s| |t_p| |R| |K| (1-\eta_A) \qquad (49)$$

$$\sin 2\theta_A \cos\left(\sum_{i=0}^{n} \Delta i + \Delta PBS\right)$$

$$I_R \sim I_0 \epsilon_0 \epsilon_1 |t_A|^2 |t_s|^2 |R|^2 (\cos^2\theta_A + \eta_A \sin^2\theta_A) = \qquad (50)$$

$$I_0 \epsilon_R |t_A|^2 |t_s|^2 |R|^2 (\cos^2\theta_A + \eta_A \sin^2\theta_A)$$

By substituting expressions (49) and (50) into equation (17), the polarizing characteristic of the polarizing beam splitter which maximizes C/N and the angle $\theta_A$ of the optic axis of the analyzers with respect to the direction of P-polarization are found as follows. However, with regard to $|t_s|^2$, consideration similar to that in the embodiment of FIG. 6 is given.

$$0.1 \leq |t_s|^2 \leq 0.5 \qquad (51)$$

$$|t_p|^2 = 1 \qquad (52)$$

$$\sin^2\theta_A = \frac{s' + t'}{(1-\eta_A) \cdot s'}\left(1 - \sqrt{\frac{\eta_A s' + t'}{s' + t'}}\right) \qquad (53)$$

$$s' = 2e\kappa\epsilon_R |t_A|^2 |t_s|^2 |R|^2 I_0 \cdot \Delta B \qquad (54)$$

$$t' = T \qquad (55)$$

If the same conditions for calculation are set, a result similar to that result shown in FIG. 9 will be obtained. However, the abscissa represents $|t_s|^2$. It is easy to make such a polarizing beam splitter 10 having a polarizing characteristic which will compensate for the phase difference between the P-polarized light and the S-polarized light caused by the recording medium.

The present invention permits various applications besides the above-described embodiments. For example, in the embodiments illustrated, the reflected light from the magneto-optical recording medium is detected, but alternatively a, design may be made such that the light beam transmitted through the magneto-optical recording medium and modulated by the Faraday effect is detected. The present invention covers all such applications without departing from the scope thereby as defined in the appended claims.

I claim:

1. A magneto-optical information reproducing apparatus comprising means for applying a light beam polarized in a predetermined direction onto a recording medium on which information is magnetically recorded, means for dividing the reflected or transmitted light beam from said recording medium modulated into a polarized state in conformity with said information by the magneto-optical effect, a plurality of analyzer means having their optic axes inclined in opposite directions with respect to said predetermined direction and analyzing said divided light beams, a plurality of photodetectors having no amplifying action and photoelectrically detecting the light beams transmitted through said plurality of analyzer means, and a signal processing means for amplifying the detection signals of said plurality of photodetectors, differentiating them and reproducing said information, the angle $\theta_A$ formed between the optic axes of said plurality of analyzer means and said predetermined direction satisfying the following conditions:

$$\sin^2\theta_A \sim \frac{S+T}{(1-\eta_A)\cdot S}\left(1 - \sqrt{\frac{\eta_A S + T}{S+T}}\right)$$

$$S = 2e\kappa\epsilon |t_A|^2 |R|^2 I_0 \cdot \Delta B$$

where $I_0$ is the quantity of light of the incident light beam on said recording medium, R is the amplitude reflectance of said recording medium, $\epsilon$ is the light utilization efficiency of the optical system from the recording medium to the photodetectors except said analyzer means, $\kappa$ is the photoelectric conversion efficiency of said photodetectors, e is the amount of charge, T is the thermal noise of said amplifying means in a magneto-optical signal observation frequency, $\Delta B$ is the band width of the detection signals, $t_A$ is the amplitude transmittance of said analyzer means, and $\eta_A$ is the extinction ratio of said analyzer means.

2. A magneto-optical information reproducing apparatus according to claim 1, further comprising a polarizing beam splitter for reflecting the light beam from said medium and directing it to said dividing means and wherein the amplitude reflectance $r_p$ of said polarizing beam splitter for the polarized component in said predetermined direction and the amplitude reflectance $r_s$ of said polarizing beam splitter for the polarized component in a direction perpendicular to said predetermined direction satisfy the following conditions, respectively:

$$0.1 \leq |r_p|^2 \leq 0.5$$

$$|r_s|^2 \sim 1.$$

3. A magneto-optical information reproducing apparatus according to claim 1, further comprising a polarizing beam splitter for transmitting therethrough the light beam from said medium and directing it to said dividing means and wherein the amplitude transmittance $t_s$ of said polarizing beam splitter for the polarized component in said predetermined direction and the amplitude transmittance $t_p$ of said polarizing beam splitter for the polarized component in a direction perpendicular to said predetermined direction satisfy the following conditions, respectively:

$$0.1 < |t_s|^2 < 0.5$$

$$|t_p|^2 \sim 1.$$

4. A magneto-optical information reproducing apparatus according to claim 1, wherein said means for applying a light beam comprises a light source and an optical system for condensing the light beam emitted from said light source on said medium.

5. A magneto-optical information reproducing apparatus according to claim 1, wherein said photodetectors are PIN photodiodes.

* * * * *

UNITED STATES PATENT AND TRADEMARK OFFICE
CERTIFICATE OF CORRECTION

PATENT NO. : 4,803,579

DATED : February 7, 1989

INVENTOR(S) : OSAMU KOYAMA

It is certified that error appears in the above-identified patent and that said Letters Patent is hereby corrected as shown below:

COLUMN 1, line 31, "effect.)" should read --effect].--.

COLUMN 3, line 50, "$S = 2e\kappa\epsilon|t_A|^2R|^2I_0 \cdot \Delta B$" should read --$S = 2 e k \epsilon|t_A|^2 |R|^2 I_0 \cdot \Delta B$ --.

COLUMN 5, line 4, "the" should be deleted.

COLUMN 6, line 12, "$I_k$," should read --$\overline{I}_k$,--;

line 18, "attribulable" should read --attributable--;

line 22, "$F_k = \xi\kappa^2 I\Delta B$ (11)" should read --$F_k = \xi\kappa^2 \overline{I}\Delta B$ (11)--;

line 24, "$S = 2e\kappa I_R \Delta B$ (12)" should read --$S = 2e\kappa \overline{I}_R \Delta B$ (12)--;

line 49, "$C/N = 10 \log_{10} \{\frac{1}{2} \kappa^2 I_k^2 / ( \frac{1}{2}\xi\kappa^2 I_k^2 +$ (17)" should read -- $C/N = 10 \log_{10} \{\frac{1}{2} \kappa^2 \overline{I}_k^2 / (\frac{1}{2}\xi\kappa^2 \overline{I}_k^2 +$ (17)-- line 53, "$2e\kappa I_R + \frac{4kT_e}{R_f}) \Delta B\}.$" should read --$2e\kappa \overline{I}_R + \frac{4\kappa T_e}{R_f}) \Delta B\}.$--.

UNITED STATES PATENT AND TRADEMARK OFFICE
CERTIFICATE OF CORRECTION

PATENT NO. : 4,803,579

DATED : February 7, 1989

INVENTOR(S) : OSAMU KOYAMA

It is certified that error appears in the above-identified patent and that said Letters Patent is hereby corrected as shown below:

COLUMN 7, line 8, "$\sin^2\theta_\wedge = \frac{s+t}{s}\left\{1 - \sqrt{\frac{t}{s+t}}\right\}$ (20)" should read --$\sin^2\theta_\wedge = \frac{s+t}{s}\left\{1 - \sqrt{\frac{t}{s+t}}\right\}$ (20)-- line 52, "$|t_s|$," should read --$|t_s|^2$,--;

line 59, "$\partial(C/N)/\partial(|tp|^2) > 0$ and" should read --$\partial(C/N/\partial(|t_p|^2) > 0$ and--.

COLUMN 8, line 1, "t = .T        (29)" should read --t = T        (29)--.

COLUMN 9, line 18, "$\varepsilon 1 = \prod_{i=1}^{n} |t_{pi}|^2$        (30)" should read --$\varepsilon 1 = \prod_{i=1}^{n} |t_{pi}|^2$        (30)--;

lines 49-52, "$\begin{cases} R = |R|e^{ia0} \\ K = |K|e^{ia0} \\ \Delta 0 = \alpha 0 - \beta 0 \end{cases}$        (32)" should read

UNITED STATES PATENT AND TRADEMARK OFFICE
CERTIFICATE OF CORRECTION

PATENT NO. : 4,803,579  Page 3 of 4
DATED : February 7, 1989
INVENTOR(S) : OSAMU KOYAMA It is certified that error appears in the above-identified patent and that said Letters Patent is hereby corrected as shown below:

$$--\begin{cases} R = |R| e^{i\alpha_0} \\ K = |K| e^{i\alpha_0} \\ \Delta_0 = \alpha_0 - \beta_0 \end{cases} \quad (32) --;$$

line 62, " $\theta_k = \frac{|K|}{|R|} \cos\Delta_0 \quad (33)$ " should read $$--\theta_k = \frac{|K|}{|R|} \cos\Delta_0 \quad (33) --.$$

COLUMN 10, line 26, "$\epsilon 2 = \epsilon 2' \cdot \epsilon 2'' = \prod_{i=1}^{n} |t_{pi}||t_{si}| \cdot \cos(\sum_{i=1}^{n} \Delta i)$"

should read $--\epsilon_2 = \epsilon_{2'} \cdot \epsilon_{2''} = \prod_{i=1}^{n} |t_{pi}| |t_{si}| \cdot \cos(\sum_{i=1}^{n} \Delta_i --$ line 39, "$\epsilon_k = \epsilon_0 \epsilon_2$" should read $--\epsilon_k = \epsilon_0 \epsilon_2 --$ line 51, "$\lambda$" should read $--\gamma--$.

COLUMN 13, line 27, "embodiments" should read --embodiment--.

UNITED STATES PATENT AND TRADEMARK OFFICE
CERTIFICATE OF CORRECTION

PATENT NO. : 4,803,579

DATED : February 7, 1989

INVENTOR(S) : OSAMU KOYAMA

It is certified that error appears in the above-identified patent and that said Letters Patent is hereby corrected as shown below:

COLUMN 14, line 24, "a," should read --,a--.

Signed and Sealed this

Seventeenth Day of April, 1990

Attest:

HARRY F. MANBECK, JR.

Attesting Officer

Commissioner of Patents and Trademarks